United States Patent
Hartl et al.

(10) Patent No.: US 9,613,473 B2
(45) Date of Patent: Apr. 4, 2017

(54) METHOD AND APPARATUS FOR ENERGY USAGE DISPLAY

(75) Inventors: Derek Hartl, Royal Oak, MI (US); Ryan Skaff, Farmington Hills, MI (US); Angela L. Watson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1574 days.

(21) Appl. No.: 12/985,575

(22) Filed: Jan. 6, 2011

(65) Prior Publication Data

US 2012/0179313 A1    Jul. 12, 2012

(51) Int. Cl.
*B60K 6/445* (2007.10)
*B60K 35/00* (2006.01)
(Continued)

(52) U.S. Cl.
CPC ............ *G07C 5/0825* (2013.01); *B60K 35/00* (2013.01); *B60R 16/0236* (2013.01); *B60W 50/14* (2013.01); *B60K 2350/1092* (2013.01); *B60W 20/00* (2013.01); *B60W 2050/146* (2013.01); *B60W 2510/085* (2013.01);
(Continued)

(58) Field of Classification Search
CPC ...... B60R 16/0236; B60K 6/46; B60K 6/445; B60K 6/365; B60K 35/00; B60L 11/1811; B60L 3/0046; H01M 8/04; C01B 3/323; G01D 13/10; A63H 18/005
USPC ....... 701/22, 31.4, 99; 180/65.285; 429/410, 429/513; 340/438; 116/200; 463/58
See application file for complete search history.

(56) References Cited

U.S. PATENT DOCUMENTS

| | | |
|---|---|---|
| 7,474,309 B2 | 1/2009 | Kolpasky et al. |
| 2002/0106540 A1* | 8/2002 | Shioya .................... C01B 3/323 |
| | | 429/410 |

(Continued)

FOREIGN PATENT DOCUMENTS

| | | |
|---|---|---|
| CN | 201589632 U | 9/2010 |
| EP | 2033830 A2 | 3/2009 |

(Continued)

OTHER PUBLICATIONS

Chinese Patent and Trademark Office, First Office Action for the corresponding Chinese Patent Application No. 201110456769.0 mailed May 5, 2015.

*Primary Examiner* — Yuri Kan
(74) *Attorney, Agent, or Firm* — Jennifer Stec; Brooks Kushman P.C.

(57) ABSTRACT

A computer-implemented method includes displaying a plurality of power consuming and producing vehicle components. The method also includes determining what components are currently consuming power and what components are currently delivering power, and to what magnitude the power is flowing between components. The method additionally includes displaying one or more arrows showing a powerflow from at least one power producing component to at least one power consuming or producing component. The method further includes displaying an indicia indicating the magnitude of the powerflow associated with the one or more arrows. Also, the method includes, for at least one power consuming component, displaying a gauge relating to a level of power being consumed by the at least one power consuming component.

12 Claims, 4 Drawing Sheets

(51) Int. Cl.
  *G07C 5/08* (2006.01)
  *B60R 16/023* (2006.01)
  *B60W 50/14* (2012.01)
  *B60W 20/00* (2016.01)

(52) U.S. Cl.
  CPC . *B60W 2510/244* (2013.01); *B60W 2510/305* (2013.01); *B60W 2560/02* (2013.01)

(56) References Cited

U.S. PATENT DOCUMENTS

| | | | |
|---|---|---|---|
| 2002/0147050 A1* | 10/2002 | Weiss | A63H 18/005 463/58 |
| 2005/0233189 A1* | 10/2005 | Shioya | H01M 8/04 429/513 |
| 2005/0256631 A1* | 11/2005 | Cawthorne et al. | 701/99 |
| 2007/0208468 A1* | 9/2007 | Sankaran | B60K 6/445 701/31.4 |
| 2008/0039989 A1* | 2/2008 | Pollack | B60L 11/1811 701/22 |
| 2009/0107391 A1* | 4/2009 | Brady | G01D 13/10 116/200 |
| 2009/0242294 A1* | 10/2009 | Kikuchi | B60K 6/46 180/65.285 |
| 2010/0052888 A1 | 3/2010 | Crowe et al. | |
| 2010/0057280 A1 | 3/2010 | Crowe et al. | |
| 2010/0057281 A1 | 3/2010 | Lawyer et al. | |
| 2010/0161217 A1* | 6/2010 | Yamamoto | B60L 3/0046 701/408 |
| 2010/0194553 A1* | 8/2010 | Mizutani | B60K 6/365 340/438 |
| 2010/0305795 A1* | 12/2010 | Kuang | B60K 35/00 701/22 |
| 2012/0179313 A1* | 7/2012 | Hartl et al. | 701/22 |

FOREIGN PATENT DOCUMENTS

| | | |
|---|---|---|
| FR | 2936480 A1 | 4/2010 |
| JP | 2921661 B2 | 7/1999 |
| JP | 2000247164 A | 9/2000 |
| JP | 3612697 B2 | 1/2005 |
| JP | 3780521 B2 | 5/2006 |
| JP | 2006290182 A | 10/2006 |
| JP | 3864403 B2 | 12/2006 |
| JP | 3937419 B2 | 6/2007 |
| JP | 2007230446 A | 9/2007 |
| JP | 4165553 B2 | 10/2008 |

* cited by examiner

METHOD AND APPARATUS FOR ENERGY USAGE DISPLAY

TECHNICAL FIELD

The illustrative embodiments generally relate to methods and apparatuses for energy usage display.

BACKGROUND

As plug-in hybrid electric vehicles (PHEVs), hybrid electric vehicles (HEVs) and battery electric vehicles (BEVs) become more common, driver's may find it desirable to adjust their way of thinking about fuel (which can include conventional fuels and/or alternative fuels, such as, but not limited to, electricity) consumption.

For example, in a conventionally fueled (e.g., gasoline) vehicle, braking is typically tantamount to fuel consumption. In other words, when the vehicle is slowed, additional fuel is required to resume a previous speed, and no fuel is gained through the braking. But, with electric powered vehicles (including vehicles with partial electric power), regenerative braking can return some measure of lost velocity in the form of electric power. While the exchange is unlikely to be perfect, it may actually be desirable, for example, when a down-hill slope is capable of returning the vehicle to speed with little or no actual fuel usage.

In other instances, certain vehicle power systems may draw power from a fuel source and force a driver to adjust conventional notions about how fuel is consumed by using vehicle accessories (such as, but not limited to, HVAC systems, vehicle power outlets, etc.).

Adjusting a basic understanding of fuel usage may be difficult for a driver who has aligned their fuel-consumption-thinking to a certain paradigm over years of using a gasoline powered vehicle. Drivers are often loathe to thoroughly study vehicle manuals, and even if they are willing to do the reading, it may not be entirely clear where the paradigm has shifted.

Additionally, different vehicles (PHEVs, HEVs, BEVs, etc.) may respond differently to electrical system usage and driving performance, and it may be difficult for a driver to keep track of all the underlying potential variables on a vehicle-by-vehicle basis.

SUMMARY

In a first illustrative embodiment, a computer-implemented method includes displaying a plurality of power consuming and producing vehicle components. The method also includes determining, using a vehicle computing system, what components are currently consuming power and what components are currently delivering power, and to what magnitude the power is flowing between components.

This illustrative method additionally includes displaying one or more arrows showing a powerflow from at least one power producing component to at least one power consuming or producing component, based at least in part on the determining.

The illustrative method further includes displaying an indicia indicating the magnitude of the powerflow associated with the one or more arrows, based at least in part on the determining.

Also, the illustrative method includes, for at least one power consuming component, displaying a gauge relating to a level of power being consumed by the at least one power consuming component.

In a second illustrative embodiment, a computer readable storage medium, stores instructions that, when executed, cause a vehicle computing system to perform the method including displaying a plurality of power consuming and producing vehicle components. The illustrative method also includes determining what components are currently consuming power and what components are currently delivering power, and to what magnitude the power is flowing between components.

This illustrative method further includes displaying one or more arrows showing a powerflow from at least one power producing component to at least one power consuming or producing component, based at least in part on the determining.

Also, this illustrative method includes displaying an indicia indicating the magnitude of the powerflow associated with the one or more arrows, based at least in part on the determining. This method additionally includes, for at least one power consuming component, displaying a gauge relating to a level of power being consumed by the at least one power consuming component.

In a third illustrative embodiment, a vehicle system includes one or more power consuming components, one or more power producing components, operable to provide power to at least one of the power consuming components, a vehicle computing system, operable to determine the existence of and magnitude of a powerflow between each of the power producing components and the power consuming components, wherein the vehicle computing system is further operable to determine a level of power usage for at least a plurality of the power consuming components, and a display output in communication with the vehicle computing system, operable to send instructions to a display.

In this illustrative system, when the vehicle computing system determines that power is flowing from at least one power producing component to at least one power consuming component, the vehicle computing system instructs the display output to send instructions instructing a display of an arrow running from the power producing component to the power consuming component. In this embodiment, the arrow indicates at least a magnitude of the powerflow.

Also, in this illustrative system, the vehicle computing system further instructs the display output to send instructions instructing a display of at least one power consuming component currently consuming power, the display of at least one power consuming component including a gauge relating to the amount of power being consumed by the at least one power consuming component.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An ever increasing number of vehicles are coming equipped with navigation or other visual displays. Additionally, with the onset of vehicle computing systems capable of wireless communication with portable devices, smartphones, tablet PCs and other remote screens may be capable of acting in place of a vehicle-provided display.

In the illustrative embodiments, vehicle computing systems including with vehicles are capable of detecting power generating components and power consuming components within the powerflow grid of the vehicle. These computing systems can cause an output to be sent to a display that corresponds to detected information.

Instructions for these vehicle computing systems may be stored on machine readable storage media, such as, but not limited to, hard disk drives, CDs, DVDs, flash drives, jump drives, portable storage devices, etc.

With access to a complex visual output device comes the capacity for delivering advanced vehicle information to a driver. Navigation information, including vehicle position, map displays, and the ability to visualize and edit routes can all be presented to a driver via a display in communication with a vehicle.

In the illustrative embodiments presented herein, a vehicle computing system takes advantage of display technology to deliver advanced fuel usage information to a driver. This information may be used to adjust vehicle system usage and/or adjust driving habits.

In at least one illustrative embodiment, a powerflow configuration for a vehicle is shown to a driver on a compatible display. The powerflow may show one or more vehicle components that uses or provides energy, and it may aid a driver in understanding how to optimize power/fuel usage.

Figure 1:
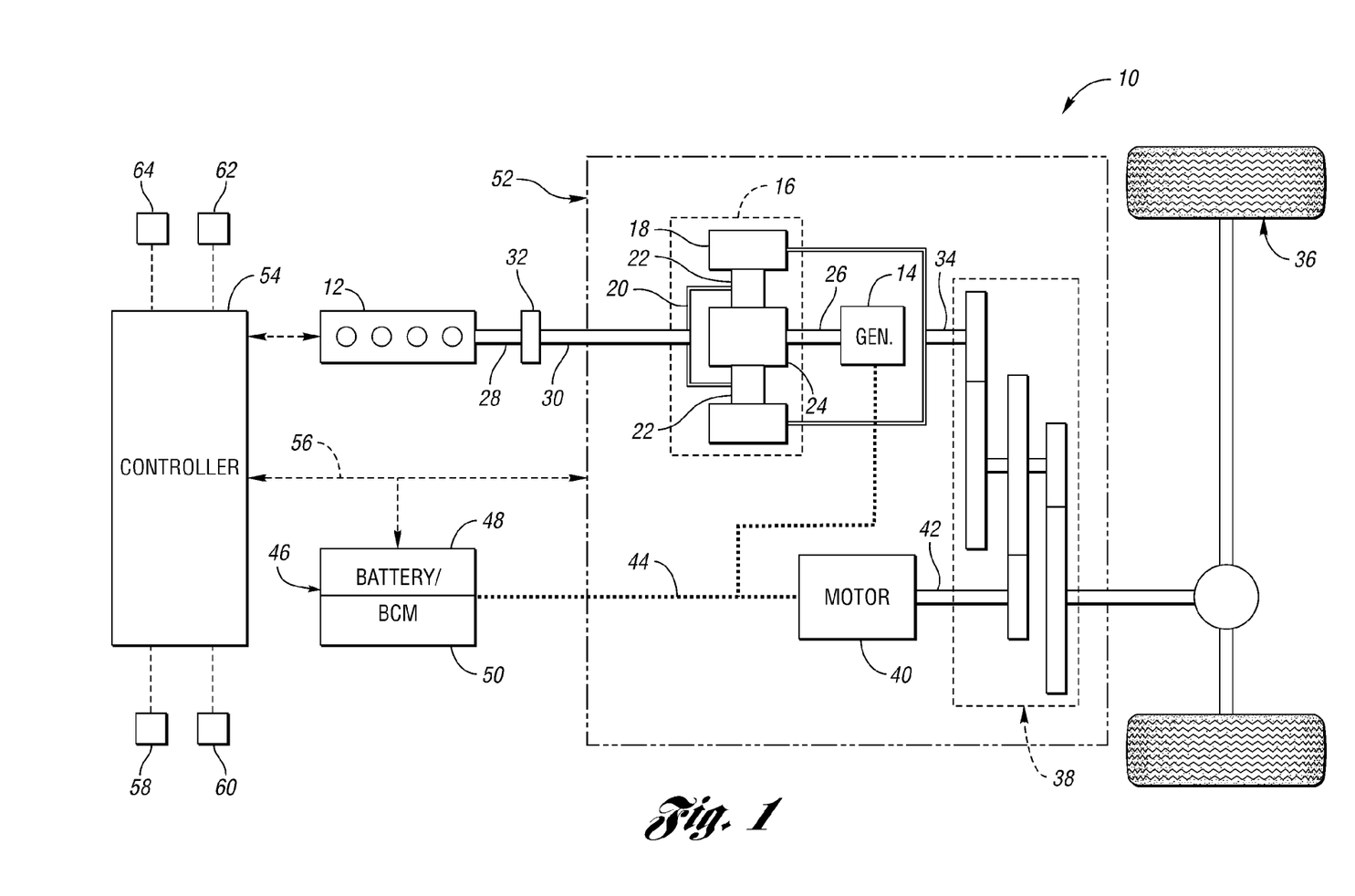
FIG. 1 shows an exemplary schematic of an HEV.

Referring now to the drawings, FIG. 1 is a simplified, exemplary schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as vehicle controller 54, may be provided. Although it is shown as a single controller, it may include multiple controllers that may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 may allow the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as those powered by an internal combustion engine alone, electric motor alone or a fuel cell.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, may communicate with the controller 54. The air conditioning system 62 may also communicate with the controller 54. The on/off status of the air conditioning system can be communicated to the controller 54, and can be based on, for example, the status of an operator actuated switch, or the automatic control of the air conditioning system 62 based on related functions such as window defrost.

In addition to the foregoing, the vehicle 10 may include an information display 64, which, as explained in detail below, can provide relevant vehicle content to the driver of the vehicle 10. As shown in FIG. 1, the information display system may include the controller 54 and an information display 64. The information display system 64 may also include its own control system, which, for reference purposes, may be a display control unit. The display control unit may communicate with the controller 54 and may perform control functions on the information display 64, although the controller 54 may also function as the information display's control system. The controller 54 may be configured to receive input that relates to current operating conditions of the vehicle 10, and the controller 54 may provide output to the display control unit such that the information display 64 conveys driving efficiency information or other information relating to the operation of the vehicle 10 to the driver.

The information display 64 may be disposed within a dashboard (not shown) of the vehicle 10, such as in an instrument panel or center console area. Moreover, the information display 66 may be part of another display system, such as a navigation display system, or may be part of a dedicated information display system. The information display 64 may be a liquid crystal display (LCD), a plasma display, an organic light emitting display (OLED), or any other suitable display. The information display 64 may include a touch screen for receiving driver input associated with selected areas of the information display 64. The information display system may also include one or more buttons (not shown), including hard keys or soft keys, located adjacent the information display 66 for effectuating driver input. Other operator inputs known to one of ordinary skill in the art may also be employed without departing from the scope of the present application.

Additionally or alternatively, a remote computing system, such as a PC, a nomadic device (such as, but not limited to, a cellular phone, smart phone, PDA, etc) or other device having a display may be used as an information display. Some or all of the processing of steps associated with illustrative embodiments disclosed herein may occur on the remote computing system as well.

Implementations of illustrative embodiments disclosed herein may be captured in programmed code stored on machine readable storage mediums, such as, but not limited to, computer disks, CDs, DVDs, hard disk drives, programmable memories, flash memories and other temporary or permanent memory sources. Execution of the programmed code may cause an executing processor to perform one or more of the methods described herein in an exemplary manner.

Figure 2:
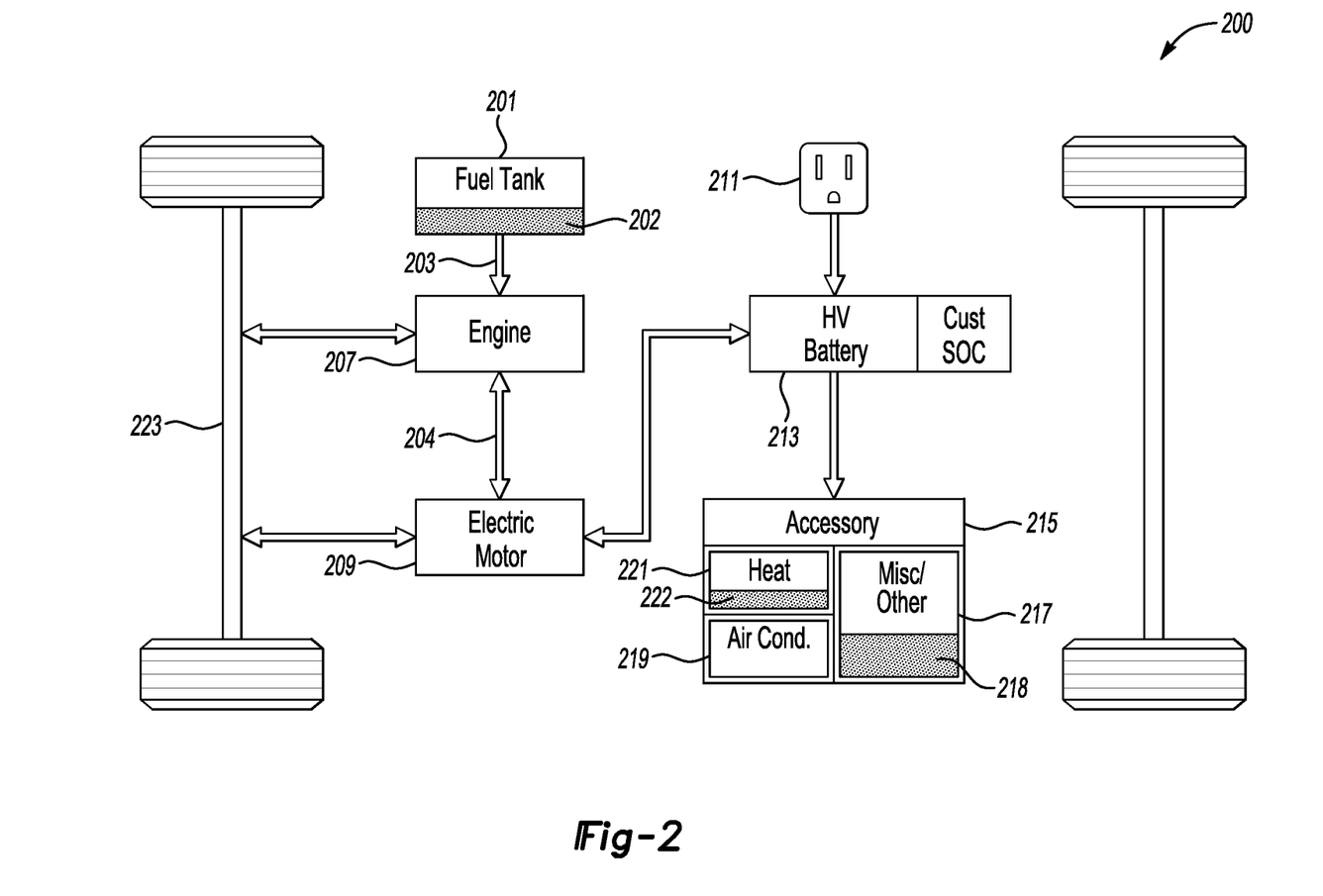
FIG. 2 shows an illustrative example of a powerflow configuration display 200 for a PHEV.

FIG. 2 shows an illustrative example of a powerflow configuration display 200 for a PHEV. In this illustrative embodiment, the vehicle has two potential sources of motive power, a high voltage (HV) battery 213, and a fuel tank 201.

The fuel tank provides power to the vehicle much in the fashion a conventional fuel tank in a gasoline powered vehicle does. In this illustrative embodiment, a fuel level 202 is also shown, so the driver can visually appreciate how much fuel remains in the tank. This level display can take any appropriate form. For example, without limitation, it could be a numeric percentage, it could be a brightness level that dims as the tank empties, it could be a gauge, etc.

In this particular embodiment, the fuel tank 201 is only shown as providing power to the engine 207. Accordingly, a unidirectional arrow 203 runs between the fuel tank and the engine. This arrow may be displayed (or lit) when the fuel is actually being consumed by the engine, in order to indicate to a driver that fuel usage is occurring. In addition to being displayed or lit, the arrow also has the potential to indicate how much fuel is being used.

The usage indication can take the form of any suitable display. For example, without limitation, the arrow could grow brighter as more fuel is being used. Or, a pulse could be shown running in the direction of the arrow, which moves faster as faster fuel consumption occurs. In another example, the arrow could be displayed in different colors based on how rapidly fuel is being consumed. In this illustrative embodiment, the arrow is only seen (or lit) when actual usage is occurring. This may help prevent driver confusion as to what power sources are currently being used by the vehicle.

A second source of power for the PHEV is the HV battery 213. Although not shown, this battery could have a "fuel gauge" associated therewith, similar to the fuel tank fuel level concept. This would allow a driver to generally recognize how much charge was remaining in the HV battery.

The HV battery primarily receives its power from a power connection 211. As with the arrow 203, the arrow indicating that power is being supplied from the power connection to the HV battery may only be displayed or lit when there is actual charging occurring.

Unlike the fuel tank, the HV battery powers several vehicle systems that run on electricity. In this illustrative embodiment, those systems are generally dividable into Accessories 215 and an Electric Motor 209.

As with the fuel tank to engine arrow 203, the powerflow from the HV battery to the accessories, at least in this embodiment, only runs in a single direction. Again, the arrow may employ an appropriate display technique to indicate the relative magnitude of the power flow. For example, without limitation, if the HV battery was supplying power to both the Electric Motor and the Accessories, the brightness of the arrow pointing to the motor might be greater than that of the arrow pointing to the accessories (depending on consumption).

The accessories themselves are divided into several subcategories. Although any display of accessories (e.g., no categories, the displayed categories, more categories, etc.) is suitable, in this illustrative embodiment the display shows a heater 221, an AC unit 219, and a misc/other unit 217 (which could include the radio, power outlets, instruments, etc). Also, associated with each displayed accessory in this embodiment, is a power level 222, 218.

The power level displayed with respect to the accessories may show the relative amount of power the accessory (or other component) is using as compared to all components, or all other accessories, etc. Alternatively (or additionally), the power level may show the relative amount of power being used by the accessory as compared to the maximum amount of power that could be being used by the accessory. As heat and other accessories are adjusted (turned off, turned higher, enabled, etc.), these power usage levels may change correspondingly.

In addition to the uni-directional arrows such as 203, there are also several bi-directional arrows, such as 204, shown in this illustrative embodiment. These arrows run between the wheels 223 and the engine 207, the wheels 223 and the electric motor 209, the electric motor 209 and the engine 207, and the electric motor 209 and the HV battery 213.

In the portions of the figure where there are bi-directional arrows, this is to indicate that energy can flow in either direction. For example, without limitation, regenerative braking systems may allow energy to be recovered from the brakes 223 and delivered to the electric motor 209. In such a case, the arrow may appear as a unidirectional arrow running from the axle 223 to the motor 209 (also possibly with a magnitude indicator, indicating how much power is being recaptured).

The energy may also then be transferred from the electric motor 209 to the HV battery for later usage. Thus, when the vehicle is traveling, arrows showing a path from the HV battery 213 to the electric motor 209 to the axle 223 may be displayed, and then, when the driver brakes, the arrows may all change directions until the vehicle comes to rest or resumes travel.

Figure 3:
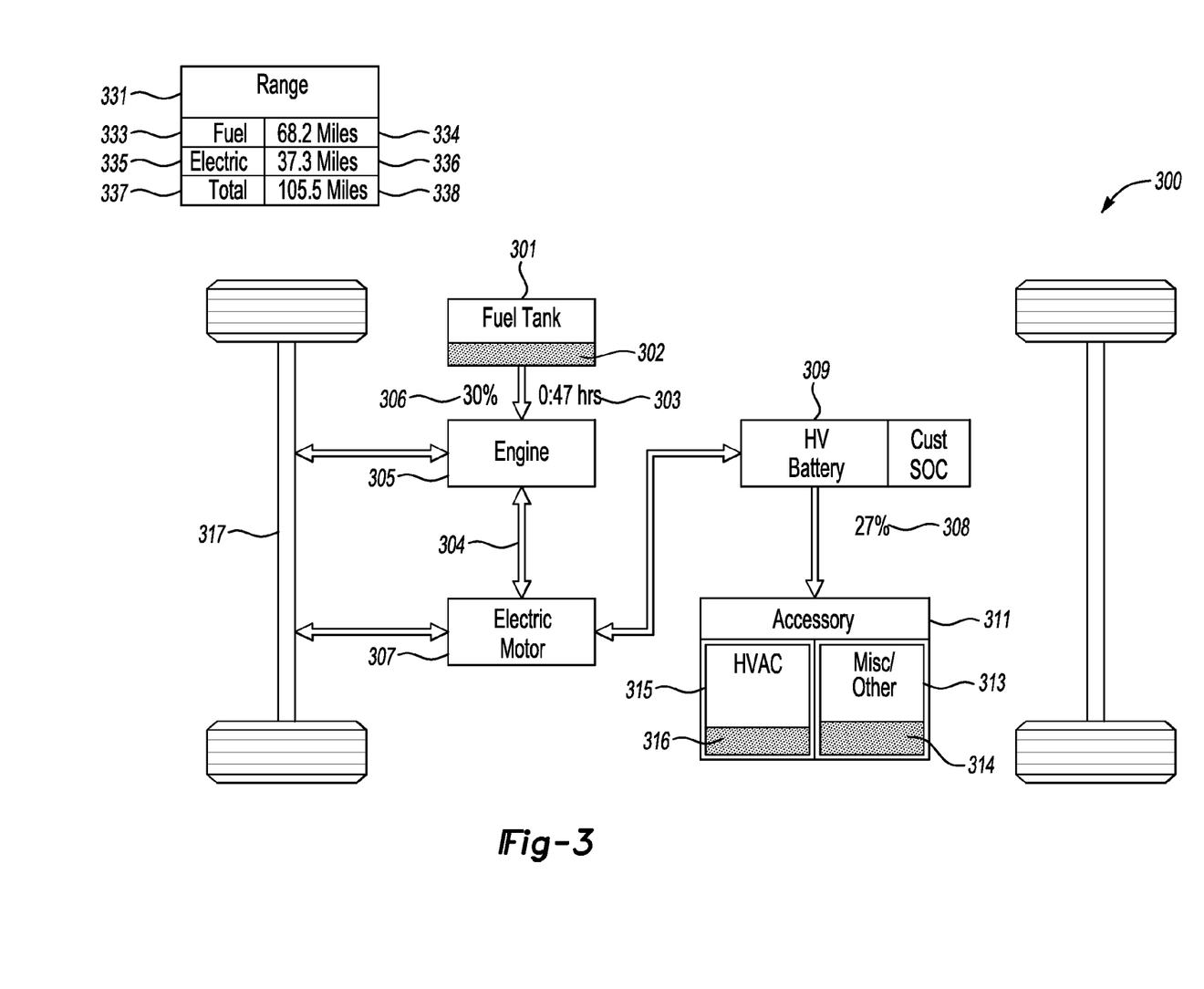
FIG. 3 shows an illustrative example of an HEV display 300.

FIG. 3 shows an illustrative example of an HEV display 300, similar to that shown in FIG. 2. In this illustrative embodiment, the vehicle does not have the capability to "plug in", so there is no display of an outlet such as 211. The fuel tank and vehicle regenerative systems provide the power to the vehicle battery 309, as can be seen by the path of arrows 304 leading from the fuel tank 301 and the axles 317 through the electric motor 307 to the HV battery 309.

In this illustrative embodiment, the accessories 311 have been grouped into two categories, HVAC (heating, ventilation, air conditioning) 315 and other 313. Again, a relative power usage 316, 314 is shown for each grouping. As with the power usage shown in FIG. 2, this could pertain to the relative usage vs each other (HVAC vs. Other), or a relative usage vs the entire system, or a relative usage vs. a maximum possible draw, etc. Additionally or alternatively, it could merely be a display of a total power draw, which rises in level (or other suitable characteristic—brightness, color change, etc) as power consumption is increased, but has nothing to do with a comparison to other components.

Also in this embodiment, a numeric percentage 308 is displayed next to the arrow running from the HV battery to the accessories. Although the arrows may indicate relative or absolute power draw based on characteristics thereof (brightness, color, pulse-speed, etc.), it may be useful for a driver to know the relative or absolute power draw of the component in a more readily comprehendible fashion. For example, in this embodiment, the percentage may indicate a relative usage, and a user can see that less power (reflected in a reduction in the number) can be used by decreasing accessory usage.

In still a further aspect of this illustrative embodiment, a percentage 306 is shown running from the fuel tank to the engine. Again, this numeric indicator (which also could be some other graphic indicator) may show a current fuel usage vs. an optimal fuel usage. Additionally or alternatively, the indicator may relate to how much of the engine is currently being powered by fuel. Still another possibility is an indicator that shows a relative amount of fuel consumption (per time and/or distance) compared to a maximum amount of fuel consumption (e.g., lower may be better in this instance).

Opposite the display 306 in this embodiment, is a numeric time indicator 303 showing how long the vehicle can continue to travel at the current consumption rate based on the amount of fuel remaining. This can be useful information if a driver knows that home is only fifteen minutes away. If the driver can maintain the same consumption rate for that time, then the driver knows that there is ample fuel remaining to get the vehicle to the house. Additionally, if the driver knows that the nearest gas station is ten minutes into a route the next morning, the driver can determine if the vehicle can both make it home and to the gas station the next day.

In this embodiment, additional range information may also be displayed 331. Since power consumption (based on, for example, accessory usage) may affect the overall potential range of the vehicle, this information can be useful in quickly determining the affects of, for example, turning the AC off. The range information shows a fuel range 333, 334, an electric power range 335, 336 and a total range 337, 338. When, for example, the AC is turned off, power consumption should decrease, and at least the electric power range 336 should increase in number. With such a rapid reference, a user can determine how many power-consuming devices to disable if running low on fuel and attempting to reach a refueling location.

Figure 4:
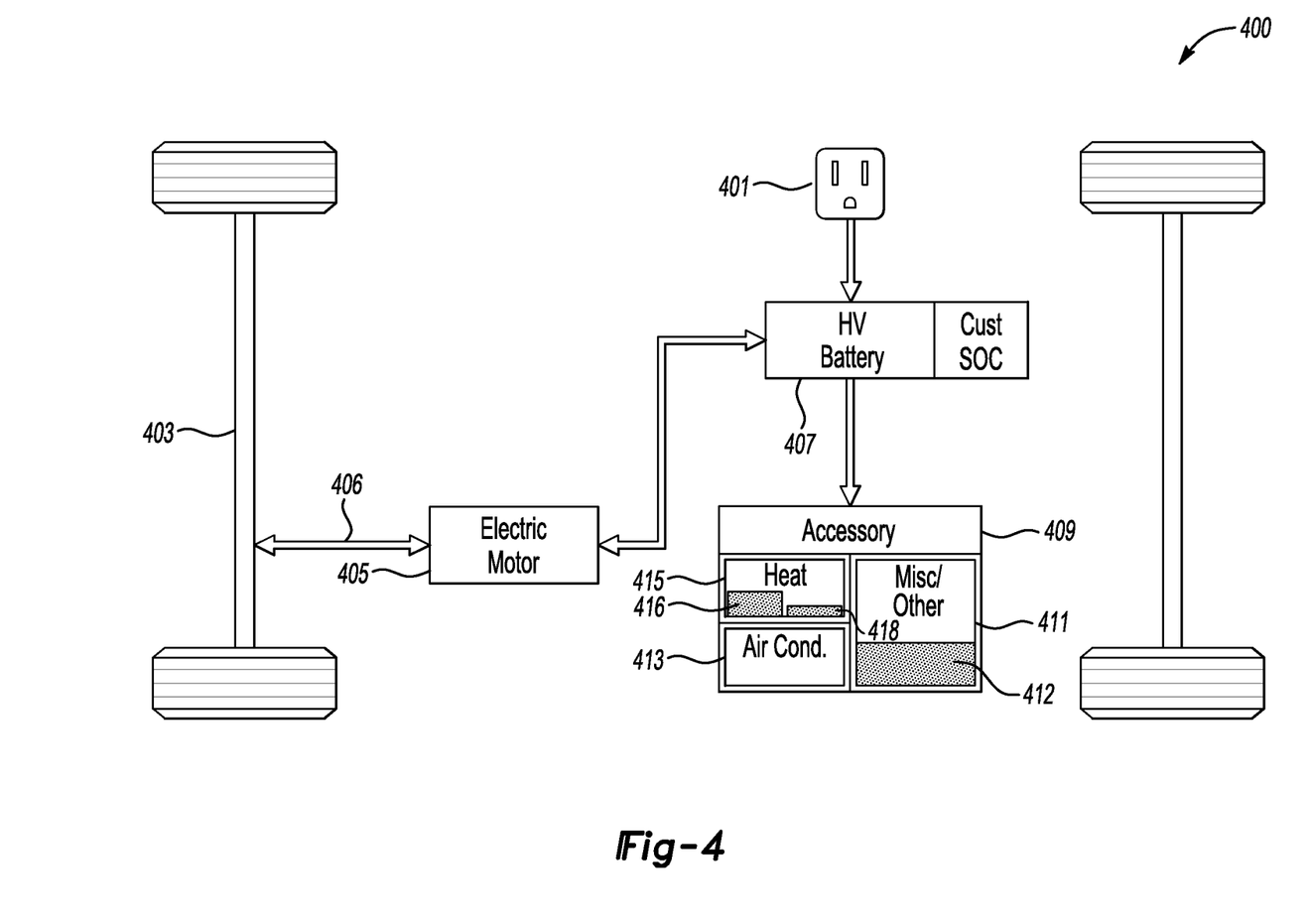
FIG. 4 shows an illustrative example of a BEV.

FIG. 4 shows an illustrative example of a BEV, similar to the vehicles shown in FIGS. 2 and 3. In this illustrative embodiment, the vehicle does not have a conventional fuel source (e.g., gasoline), but is rather powered by the HV battery 407. Since the battery receives its power from a power grid, a connection 401 to the power grid is shown, and an arrow capable of being displayed or lit runs from the power connection to the HV battery.

Powerflow also runs 406 to and from the axle 403 through the electric motor 405. As with the other vehicles, regenerative systems, such as, but not limited to, regenerative braking systems, allow the vehicle to generate power and add that power to an HV battery 407. Display of information such as this could be useful if, for example, a user is traveling down-hill. It may not occur to a driver who is only familiar with liquid fuel vehicles to apply the brakes in order to add power to a vehicle battery. But, when the driver is able to see a tangible return resulting from braking the vehicle, the driver then can realize that the application of brakes is beneficial for more reasons than simply slowing the vehicle.

In this illustrative embodiment, several types of power usage are displayed. With respect to the Heat portion 415 of the accessories 409, there are two types of power usage shown in this embodiment. The first type is power relative to maximum draw 416. In other words, the level of the gauge shows how much power is being used, as compared to how much power would be used if the Heater was running at a maximum draw.

The second meter 418 shows power relative to the entire system. In other words, in this illustrative example, the power meter 418 shows how much power is being used by the heater, as compared to all the power currently being used. This may allow a driver to recognize if a particular device is overtaxing the electrical system, or is otherwise simply drawing too much power to be efficient. For example, if a driver is running low on power and needs to travel twenty miles, and notices that the Heater is pulling 20% of the total power usage for the system, the driver may elect to lower or turn off the Heater in order to conserve power. On the other hand, if the Heater is running at near capacity and is barely representing significant power usage, the driver may decide that any discomfort associated with turning off the heater is not worth the small marginal return in power.

In this embodiment, the AC 413 is not drawing any power, and the Misc/Other accessories 411 are drawing a relative total amount of power 412 that is about double that of the heater (total power usage relative to maximum is not shown for this category, since the maximum draw may vary based on attached peripherals).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   displaying a power-consuming accessory and a power-producing vehicle component;
   displaying an arrow showing a powerflow from the component to the accessory;
   displaying a visual indicator indicating a powerflow magnitude associated with the arrow, the indicator visually varying based on changes in powerflow magnitude; and
   displaying a gauge showing instantaneous power consumption of the accessory relative to a maximum power consumption.

2. The method of claim 1, wherein the indicator is a brightness level.

3. The method of claim 1, wherein the indicator is a change of color.

4. The method of claim 1, wherein the indicator is the speed of a pulse moving along the one or more arrows.

5. The method of claim 1, further comprising displaying numeric values for remaining travel distance and/or time based on remaining fuel, wherein the numeric values adjust dynamically as the accessory is set to consume more or less power.

6. The method of claim 5, wherein fuel includes gasoline.

7. The method of claim 5, wherein fuel includes electricity.

8. The method of claim 1, further comprising displaying a numeric indicator next to the arrow, the indicator demonstrating a level of powerflow between the component and accessory connected by the arrow.

9. A non-transitory computer readable storage medium, storing instructions that, when executed, cause a vehicle computing system to perform the method comprising:
   displaying a power-consuming accessory and power-producing vehicle components;
   displaying an arrow showing a powerflow from the component to the accessory;
   displaying a visual indicator indicating a powerflow magnitude associated with the arrow, the indicator visually varying as accessory power consumption changes; and
   displaying a gauge showing current power being consumed by the accessory.

10. A vehicle system comprising:
    a power consuming accessory;
    a power producing component, operable to provide power to the accessory;
    a vehicle computing system, configured to determine magnitude of a powerflow between the component and accessory and an instantaneous level of power usage for the accessory,
    wherein, the vehicle computing system is configured to instruct a display to show an arrow from the component to the accessory, the arrow indicating a magnitude of the powerflow via a visual indicator that visually varies with changes in the magnitude and to show a gauge in proximity to a displayed accessory indicating instantaneous power usage by the accessory.

11. The system of claim 10, wherein the vehicle computing system is configured to instruct the display to show the instantaneous power usage by the accessory relative to a maximum power usage by the accessory.

12. The system of claim 10, wherein the vehicle computing system is configured to instruct the display to show the instantaneous power usage by the accessory relative to power usage by at least one other active accessory.

* * * * *